Patented Feb. 15, 1938

2,108,468

UNITED STATES PATENT OFFICE 2,108,468

PREPARATION OF HIGH MOLECULAR SULPHUR CONTAINING PLASTICS

Wilhelm Becker, Cologne-Mulheim, and Ludwig Orthner, Frankfort-on-the-Main, Germany, assignors to I. G. Farbenindustrie Aktiengesellschaft, Frankfort-on-the-Main, Germany No Drawing. Application April 15, 1935, Serial No. 16,534. In Germany April 18, 1934

8 Claims. (Cl. 260—6)

The present invention relates to improvements in the preparation of high molecular sulphur containing plastics and to the new products obtainable thereby.

The starting materials made use of in accordance with our present invention are 2-chloroethyl-2'-chloroethylether on the one hand and water soluble polysulphides on the other hand. These compounds if caused to react upon each other in an aqueous or alcoholic aqueous medium yield a condensation product in form of a cake which owing to its strongly coherent nature cannot be purified and can be worked up only with difficulty.

The condensation product thus obtainable if subjected to a heat treatment either alone or in combination with a natural or synthetic rubber can be transformed into a product which shows properties resembling those of vulcanized rubber. These vulcanizates are distinguished by their being extremely resistant towards aliphatic or aromatic hydrocarbons and can, therefore, be employed for oil pipes and so on. However, the elastic properties of the said products are unfortunately not such as to allow their use as a substitute for natural rubber for the purposes in question. It is, therefore, a problem to increase the "nerve" of the products without impairing their resistance towards solvents.

In accordance with our present invention we are able to improve the elasticity of the said products by causing the reaction to proceed in the presence of superficially active solid products, which are insoluble in the reaction medium. As examples for compounds of the character described we mentioned barium sulphate, magnesium hydroxide, aluminium silicate and the like. Working in the presence of the said compounds effects that the condensation products are obtained in form of a suspension which can be coagulated by heating or acidifying. The suspensionlike nature of our reaction products permits one to purify the same, for instance, by acidification and vapor distillation in order to remove ill-smelling impurities, which may be contained therein and could prevent the practical use of the condensation products.

Among the superficially active substances enumerated above, barium sulphate, particularly a freshly precipitated one, has proved to be especially suitable for the purpose in question. This is in the first line due to the fact that barium sulphate owing to its high specific gravity causes the reaction product intermixed therewith to settle, thus facilitating the removal of the reaction medium and the working up of the product. Moreover, barium sulphate being resistant to acids permits one to purify the suspension by acidification and vapor distillation, without effecting coagulation of the suspension. Considering the fact that our products are employed on a large scale for electric insulating purposes it is, furthermore, of great importance that barium sulphate owing to its insolubility in water does not impair the insulating capacity of the vulcanizates in any way.

The reaction is preferably performed in an aqueous medium although other solvents, such as an aqueous alcoholic medium are not excluded from the scope of our invention. One method of working consists in the simultaneous application of emulsifying agents, such as condensation products of hydrolyzed albumen and oleic acid chloride, sulphonic acids of alkylated naphthalenes and the like. Coagulation of our suspensions is preferably effected by mere heating, acidifying being of advantage in case magnesium hydroxide is employed as superficially active substance. In case of working in the presence of barium sulphate, the suspension settles upon mere standing as stated above and can be worked up directly—after washing with water—by drying on the roller at about 135° C. As polysulphides there are employed alkali, ammonium and earthalkali polysulphides, preferably those of the tetrasulphide stage.

The outstanding feature of our invention lies in the fact that the mechanical properties of the condensation products in question are considerably improved with regard to elasticity and tensile strength of the vulcanizates obtained therefrom. Whereas vulcanizates from products prepared in the absence of our superficially active substances are in some respects more leatherlike than caoutchouc-like, our new vulcanizates show—besides their swelling resistance towards benzene and benzines—good elastic properties and an extremely good tensile strength. For the purpose of vulcanization our condensation products can be mixed with fillings, softeners and in some cases with sulphur. Mixtures of the said condensation products with natural rubber or other condensation products of polysulphides with polyhalogen compounds may also be employed, the simultaneous application of zinc oxide, sulphur and vulcanization accelerators being preferable if a considerable amount of caoutchouc is employed. The shaping can be effected in the manner usually employed in the rubber industry, for instance, by pressing into iron moulds, spraying and so on.

The vulcanizates thus obtainable are distinguished when compared with natural rubber by their considerably better fastness to swelling towards aromatic and aliphatic hydrocarbons or other solvents which have a swelling effect upon rubber. Furthermore, they show an outstanding resistance capacity towards light and ozone. They show advantages over the hitherto known products obtained from the condensation products of chlorinated hydrocarbons with alkali polysulphides insofar, as after shaping and while still hot, they can be removed from the mould without involving the danger that the products become porous. Moreover, they have no obnoxious odor, either during the shaping or in the finished state.

The quantity of the softeners and fillings to be added can be varied within wide limits. The addition of carbon black and zinc oxide has proved particularly advantageous. A softening of the mass is effected by basic compounds, as for instance, the vulcanization accelerator diphenyl guanidine. The physical properties of the shaped articles can be improved by the addition of natural rubber. The addition of a relatively small amount of rubber effects an improvement in strength without impairing the fastness to swelling by aliphatic and aromatic hydrocarbons. Even if 25% of natural rubber is added, the shaped articles obtained prove to be practically resistant towards benzine and benzene.

A modification of the vulcanization process described above consists in effecting the shaping by applying a coating containing the condensation products in question upon shaped unvulcanized or vulcanized mixtures of natural rubber and then subjecting it to a heat treatment and, if desired, to a pressure treatment. In this way a coating can be brought on to shaped materials of natural rubber, by which the latter acquire a higher resistance towards mechanical and chemical action.

The following examples illustrate the invention, the parts being by weight:—

Example 1

66.6 kgs. of crystallized sodium sulphide are fused together with 33.3 kgs. of sulphur and the whole filtered and then diluted with 33 kgs. of water. This polysulphide solution is introduced into a vessel of 200 litres content, 4 kgs. of a 33% caustic soda solution are added while stirring and then a solution of 3.26 kgs. of crystallized magnesium chloride in 5 litres of water. The polysulphide solution is then heated to boiling with the precipitated magnesium hydroxide and slowly mixed at the boiling temperature with 19.7 kgs. of 2-chloroethyl-2'-chloroethylether.

After the addition of the ether the boiling temperature is maintained in the suspension. Thereupon the condensation product is filtered off from the excess of sulphide liquor and washed free by means of water. After introducing the condensation product into water, acidification by means of hydrochloric acid and introduction of steam, it coagulates to form a rubber-like mass, which can be dried according to usual methods. The yield amounts to 25 kgs. of the condensation product.

100 parts of the product thus obtained are thoroughly mixed on a roller with 50 parts of inactive carbon black and 10 parts of zinc oxide. The mixture obtained is then heated to 142° C. for 90 minutes under pressure in a vulcanizing press.

In the following there is given another example for the vulcanization: 100 parts of the same condensation product as described above are rolled to a homogenous mixture with 15 parts of smoked sheets, 10 parts of zinc oxide and 50 parts of inactive carbon black. The mixture is then pressed for 80 minutes at 142° C.

Example 2

720 kgs. of crystallized sodium sulphide are fused together with 360 kgs. of sulphur and after dilution with 360 kgs. of water the whole is mixed with a solution of 8 kgs. of sodium sulphate in 25 kgs. of water. A solution of 12 kgs. of barium chloride in 50 kgs. of water is then added while vigorously stirring, whereby a finely distributed precipitate of barium sulphate is formed. The solution is then heated to boiling with refluxing and 213 kgs. of 2-chloroethyl-2'-chloroethylether are added slowly. Thereupon the suspension of the condensation product obtained is heated to boiling for 16 hours and, finally, the suspension is filtered off from the excess of sulphide liquor. The suspension freed from sulphide is subjected to steam distillation and coagulated by drying on the roller. In this manner 300 kgs. of a light yellow, elastic and rubber-like mass are obtained.

Example 3

To a calcium polysulphide solution, containing 434 kgs. of calcium sulphide and 720 kgs. of sulphur in 2000 kgs. of water, 35 kgs. of magnesium chloride and 43 kgs. of a 33% caustic soda solution are added. The solution is heated to boiling and then 185 kgs. of 2-chloroethyl-2'-chloroethylether are added while maintaining the reaction solution at boiling temperature for 15 hours. After filtration and washing of the suspension, the condensation product is worked up as described in Example 1. 220 kgs. of a brown, not very plastic but exceedingly elastic mass are thus obtained.

100 parts of this product are mixed with 75 parts of inactive carbon black and 5 parts of active zinc oxide. The mixture is then treated as described in Example 1.

Example 4

360 kgs. of calcium sulphide are fused together with 180 kgs. of sulphur and after the addition of 130 kgs. of water the whole is mixed with 125 kgs. of water glass solution. A solution of 47 kgs. of potassium-aluminium sulphate in 50 kgs. of water is then added while stirring, the whole is then heated to boiling and 180 kgs. of 2-chloroethyl-2'-chloroethylether are poured in. Heating is continued for 10 hours, the condensation product obtained is filtered off, washed on the roller and finally treated with steam in the presence of hydrochloric acid. 220 kgs. of the condensation product are thus obtained.

Example 5

A condensation product of sodium polysulphide and 2.2'-dichloroethylether is prepared in the following manner: 500 parts of sodium sulphide and 250 parts of sulphur are melted on a water bath with the addition of 80 parts of alcohol while introducing hydrogen. The clear melt obtained is diluted with 240 parts of water. 140 parts of 2.2'-dichloroethylether are introduced at 80 to 100° C. into the solution which contains $Na_2S_4$ and $Na_2S_5$. The solution is then warmed for 6 to 8 hours. After treatment with steam 230 parts of a pale, highly viscous elastic caoutchouc-like mass are obtained.

100 parts of the condensation product thus obtained are mixed with 33 parts of crepe caoutchouc, 10 parts of zinc oxide, 50 parts of inactive carbon black and 0.5 parts of mercaptobenzothiazole. The mixture is then pressed for 60 minutes at 142° C.

*Example 6*

A vessel provided with a stirrer is filled with 180 parts of a $Na_2S_{4.5}$-solution (corresponding to 98 parts of crystallized sodium sulphide). While stirring a solution of 5 parts of sodium sulphate in 10 parts of water is added thereto and then a solution of 7.5 parts of crystallized barium chloride is 20 parts of water, the temperature being about 35° C. At a temperature of about 108° C. there are then gradually added 28 parts of sym.-dichlorodiethylether. After some hours standing the excess of watery solution is removed from the settled suspension. The latter is washed with water and purified by vapor distillation. The reaction product is dried on the roller at about 135° C.

We claim:

1. The process which comprises causing a polysulphide selected from the group consisting of alkali-, ammonium- and earthalkali metal polysulphides to react upon 2-chloroethyl-2'-chloroethylether in the presence of water and finely divided barium sulphate.

2. The process which comprises causing a polysulphide selected from the group consisting of alkali-, ammonium- and earthalkali metal polysulphides to react upon 2-chloroethyl-2'-chloroethylether in the presence of water and finely divided freshly precipitated barium sulphate.

3. A vulcanizable composition comprising unvulcanized rubber and a high sulphur plastic obtained by the interaction of a polysulphide and 2-chloroethyl-2'-chloroethylether in the presence of water and finely divided barium sulphate.

4. A vulcanizable composition comprising a high sulphur plastic obtained by the interaction of polysulphide and 2-chloroethyl-2'-chloroethylether in the presence of water and finely divided barium sulphate.

5. Vulcanizates which are obtainable by heating the vulcanizable composition as claimed in claim 3.

6. Vulcanizates which are obtainable by heating the vulcanizable composition as claimed in claim 4.

7. The process which comprises causing a tetrasulphide selected from the group consisting of alkali-, ammonium- and earthalkali metal tetrasulphides to react upon 2-chloroethyl-2'-chloroethylether in the presence of water and finely divided barium sulphate.

8. The process which comprises causing a tetrasulphide selected from the group consisting of alkali-, ammonium- and earthalkali metal tetrasulphides to react upon 2-chloroethyl-2'-chloroethylether in the presence of water and finely divided freshly precipitated barium sulphate.

WILHELM BECKER.
LUDWIG ORTHNER.